US008702487B2

(12) United States Patent
Thomas

(10) Patent No.: US 8,702,487 B2
(45) Date of Patent: Apr. 22, 2014

(54) GAMING MACHINE HAVING A GAME OUTCOME DETERMINED BY GROUP ASSOCIATION

(75) Inventor: Alfred Thomas, Las Vegas, NV (US)

(73) Assignee: WMS Gaming Inc., Waukegan, IL (US)

(*) Notice: Subject to any disclaimer, the term of this patent is extended or adjusted under 35 U.S.C. 154(b) by 2055 days.

(21) Appl. No.: 11/240,152

(22) Filed: Sep. 30, 2005

(65) Prior Publication Data

US 2006/0073880 A1 Apr. 6, 2006

Related U.S. Application Data

(60) Provisional application No. 60/615,039, filed on Oct. 1, 2004.

(51) Int. Cl.

| | |
|---|---|
| ***A63F 13/00*** | (2006.01) |
| ***G07F 17/32*** | (2006.01) |
| *G07F 17/34* | (2006.01) |

(52) U.S. Cl.

CPC .............. *G07F 17/32* (2013.01); *G07F 17/326* (2013.01); *G07F 17/3267* (2013.01); *G07F 17/3213* (2013.01); *G07F 17/34* (2013.01)

USPC ................... 463/16; 463/20; 463/25; 463/26; 463/27; 463/28; 273/138.1; 273/138.2

(58) Field of Classification Search

CPC ... G07F 17/32; G07F 17/326; G07F 17/3267; G07F 17/3213; G07F 17/34

USPC ............. 463/16, 20, 25–28; 273/138.1, 138.2

See application file for complete search history.

(56) References Cited

U.S. PATENT DOCUMENTS 4,695,053 A * 9/1987 Vazquez et al. ................. 463/18
5,221,094 A 6/1993 Hanson
5,401,024 A 3/1995 Simunek
5,580,053 A 12/1996 Crouch
5,755,619 A 5/1998 Matsumoto et al.
5,755,621 A 5/1998 Marks et al.
5,772,506 A 6/1998 Marks et al.
5,833,537 A 11/1998 Barrie (Continued)

FOREIGN PATENT DOCUMENTS

EP 0862152 A1 9/1998
EP 0874337 A1 10/1998

(Continued)

OTHER PUBLICATIONS

Article by Frank Legato, "Battle Plan—Battleship All Aboard," *Strictly Slots*, pp. 54-56 (Sep. 2000).

(Continued)

*Primary Examiner* — William H McCulloch, Jr.
(74) *Attorney, Agent, or Firm* — Nixon Peabody LLP

(57) ABSTRACT

A method and apparatus for playing a wagering game with a winning game outcome determined by the selection of at least two groups from a plurality of groups. Each group having a plurality of possible game outcomes, with the possible game outcomes duplicated in some or all of the groups. The winning or selected game outcome is the game outcome associated with each of the selected groups. The selected game outcome may be determined by the intersection of the selected groups, or may be the game outcome that is common to each of the selected groups.

6 Claims, 9 Drawing Sheets

(56) References Cited

U.S. PATENT DOCUMENTS

| | | | | |
|---|---|---|---|---|
| 5,855,514 | A | 1/1999 | Kamille | |
| 5,897,436 | A | 4/1999 | Singer et al. | |
| 5,919,088 | A | 7/1999 | Weiss | |
| 5,935,002 | A * | 8/1999 | Falciglia | 463/19 |
| 5,944,605 | A | 8/1999 | Pajitnov | |
| 6,015,346 | A | 1/2000 | Bennett | |
| 6,093,100 | A | 7/2000 | Singer et al. | |
| 6,093,102 | A * | 7/2000 | Bennett | 463/20 |
| 6,102,798 | A * | 8/2000 | Bennett | 463/16 |
| 6,110,043 | A | 8/2000 | Olsen | |
| 6,261,177 | B1 * | 7/2001 | Bennett | 463/16 |
| 6,309,299 | B1 * | 10/2001 | Weiss | 463/20 |
| 6,371,851 | B1 | 4/2002 | Singer et al. | |
| 6,398,644 | B1 | 6/2002 | Perrie et al. | |
| 6,428,412 | B1 * | 8/2002 | Anderson et al. | 463/9 |
| 6,464,582 | B1 * | 10/2002 | Baerlocher et al. | 463/20 |
| 6,561,899 | B2 * | 5/2003 | Vancura | 463/16 |
| 6,585,591 | B1 * | 7/2003 | Baerlocher et al. | 463/25 |
| 6,645,071 | B2 | 11/2003 | Perrie et al. | |
| 6,855,055 | B2 | 2/2005 | Perrie et al. | |
| 6,881,146 | B2 * | 4/2005 | Anderson et al. | 463/16 |
| 6,988,948 | B2 * | 1/2006 | Perrie et al. | 463/25 |
| 7,229,350 | B2 * | 6/2007 | Baerlocher et al. | 463/20 |
| 7,270,604 | B2 * | 9/2007 | Gerrard et al. | 463/16 |
| 7,300,348 | B2 * | 11/2007 | Kaminkow et al. | 463/17 |
| 7,354,342 | B2 * | 4/2008 | Paulsen et al. | 463/16 |
| 7,575,514 | B2 * | 8/2009 | Cuddy et al. | 463/16 |
| 2002/0058544 | A1 | 5/2002 | Perrie et al. | |
| 2002/0198036 | A1 | 12/2002 | Baerlocher et al. | |
| 2005/0009594 | A1 * | 1/2005 | Baerlocher et al. | 463/16 |
| 2005/0026671 | A1 * | 2/2005 | Baerlocher | 463/16 |
| 2005/0037833 | A1 | 2/2005 | Perrie et al. | |
| 2005/0049041 | A1 * | 3/2005 | Baerlocher et al. | 463/25 |
| 2006/0040721 | A1 * | 2/2006 | Cuddy et al. | 463/16 |
| 2006/0073880 | A1 * | 4/2006 | Thomas | 463/20 |

FOREIGN PATENT DOCUMENTS

| | | | |
|---|---|---|---|
| EP | 0875870 | A2 | 11/1998 |
| GB | 2105560 | A | 3/1983 |
| GB | 2229371 | A | 9/1990 |
| GB | 2231189 | A | 11/1990 |
| GB | 2252705 | A | 8/1992 |
| GB | 2271262 | A | 4/1994 |
| WO | WO 98/09258 | | 3/1998 |
| WO | WO 98/09259 | | 3/1998 |

OTHER PUBLICATIONS

Article by Melissa Raimondi,“Slot Toppers—Battleship All Aboard,” *Strictly Slots*, pp. 72-73 (Dec. 2000).

Article (Author Unknown), “Battleship Treasure Quest,” *Strictly Slots*, p. 67 (Sep. 2003).

* cited by examiner

GAMING MACHINE HAVING A GAME OUTCOME DETERMINED BY GROUP ASSOCIATION

CROSS-REFERENCE TO RELATED APPLICATIONS

This application claims the benefit of priority of U.S. Provisional Patent Application No. 60/615,039, filed Oct. 1, 2004, which is hereby incorporated by reference in its entirety.

FIELD OF THE INVENTION

The present invention generally relates to gaming machines and, more particularly, to gaming machines having a bonusing feature that identifies a selected game outcome from a plurality of award groups.

FIELD OF THE INVENTION

The present invention generally relates to gaming machines and, more particularly, to gaming machines having a bonusing feature that identifies a selected game outcome from a plurality of award groups.

BACKGROUND OF THE INVENTION

Gaming machines, such as slot machines, video poker machines, and the like, have been a cornerstone of the gaming industry for many years. The popularity of such machines is generally dependent on the likelihood (or perceived likelihood) of winning money at the machine and the intrinsic entertainment value that the gaming machine provides. Where the available gaming options include numerous competing machines and the expectation of winning at each machine is roughly the same (or believed to be the same), players are most likely to be attracted to the most entertaining and exciting of the machines. Consequently, operators strive to employ the most entertaining and exciting machines available. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game. The bonus game may be played in conjunction with a "base" game. The bonus game may comprise any type of game, either similar to or completely different from the base game, which is entered upon the occurrence of a selected event or outcome of the base game. This selected event or game outcome is known as a triggering event. Such a bonus game produces a significantly higher level of player excitement than the base game because it provides a greater expectation of winning than the base game and is often accompanied by more attractive or visually interesting game.

Many bonus games have depended upon relatively simple techniques of picking hidden bonus awards from a group of bonus awards to reveal the award amounts payable to the player. Generally, a player continues to pick bonus awards until a stopper or other mechanism exits the player from the bonus game. In lieu of a stopper, the player may have a limited number of selections in the bonus game before the player is exited from the bonus game back into the base game. The player may also be presented with an alternative hidden bonus value, which the player may accept or decline. The selection type bonus games are relatively simplistic. A new game play mechanism is needed to enhance these random selections of bonus values.

One method for improving the anticipation and excitement of the bonus game is to reveal all of the possible bonus game outcomes to the player at the start of the bonus game. The bonus game randomly eliminates possible bonus game outcomes in successive stages until only a single bonus award remains. The remaining award is paid to the player. This allows the player to know the potential awards that he can obtain at the onset of the bonus game, and at each stage of the game allows the player to re-evaluate the award the player could potentially obtain as bonus awards are eliminated.

SUMMARY OF THE INVENTION

The present invention is directed to a gaming machine having an improved game outcome selection and presentation to enhance the entertainment value of the game. The bonus game award is selected by virtue of its association to at least two bonus groups, each bonus group having a plurality of possible game outcomes. The bonus groups used for determining the winning game outcome are selected from a plurality of possible bonus groups. The association between the selected bonus groups may include common possible game outcomes as represented in the bonus groups selected. It may also include the physical or visual intersection of the selected bonus groups to define the selected game outcome, and any other type of association that can define a selected game outcome from two separate groups of possible game outcomes.

Many different methodologies may be used to select the particular groups from which the selected game outcome may be determined. For example, the bonus game could be a gaming machine having a selector mechanism to identify selected award groups. The selector mechanism may be a typical slot type base game to randomly identify selected award groups used to determine the selected game outcome. The selector mechanism may also be part of the bonus game itself (i.e., the base game's association with the bonus game limited to triggering the bonus event).

In one embodiment of the present invention, a gaming machine comprises a wager acceptor for accepting a wager to initiate game play. The gaming machine also comprises a central processor unit for randomly selecting a selected game outcome from a plurality of possible game outcomes. The plurality of possible game outcomes forms a plurality of groups. Each of the plurality of possible game outcomes is defined by two groups from the plurality of groups. The central processor unit further determines the two groups defining the selected game outcome. The gaming machine also comprises a display in communication with the central processor unit. The display displays each of the plurality of groups and the plurality of possible game outcomes in each of the plurality of groups. The gaming machine further comprises a payoff mechanism in communication with the central processor unit to make an award for the selected game outcome.

In another embodiment of the present invention, a gaming machine comprises a wager acceptor for accepting a wager to initiate game play. The gaming machine also comprises a central processor unit for randomly selecting at least two groups from a plurality of groups. Each of the plurality of groups has at least one possible game outcome. The central processor identifies a selected game outcome that is associated with each of the at least two groups. The gaming machine further comprises a display in communication with the central processor unit. The display displays each of the plurality of groups and the plurality of possible game outcomes in each of the plurality of groups. The gaming machine further comprises a payoff mechanism in communication with the central processor unit to make an award for the selected game outcome.

According to another embodiment, a method for playing a wagering game on a gaming machine comprises accepting a wager and displaying a plurality of groups. Each of the plurality of groups has a plurality of possible game outcomes. Each of the plurality of possible game outcomes is associated with two groups from the plurality of groups. The method further includes randomly determining a first group, randomly determining a second group, identifying a selected game outcome associated with both the first group and the second group and making an award for the selected game outcome.

According to yet another embodiment, a method for playing a wagering game on a gaming machine comprises accepting a wager and displaying a plurality of possible game outcomes organized into a plurality of groups on a display. Each possible game outcome is associated with at least two groups. The method also includes determining a selected game outcome from the plurality of possible game outcomes and determining the at least two groups associated with the selected game outcome. The method further includes distinguishing the at least two groups associated with the selected game outcome from the plurality of groups on the display and making an award for the selected game outcome.

According to a further embodiment, a method for playing a wagering game on a gaming machine comprises accepting a wager and displaying a rectangular array of possible game outcomes. Each possible game outcome is in a horizontal and a vertical group. The method also includes randomly determining a first group and a second group and selecting a first award area relative to the first group and a second award area relative to the second group. The method further includes determining a plurality of selected game outcomes, wherein the selected game outcomes comprises the intersection of the first award area and the second award area, and making an award for each of the plurality of selected game outcomes.

In another embodiment, a method for playing a wagering game on a gaming machine comprises accepting a wager and displaying an array of possible game outcomes. Each possible game outcome is uniquely defined by a coordinate system. The method also includes randomly selecting a first coordinate and a second coordinate and making an award for the selected game outcome defined by the first coordinate and the second coordinate. The coordinate system may include a rectangular coordinate system having an x-coordinate and a y-coordinate to define each possible game outcome. Alternatively, the coordinate system may include a polar coordinate system having a distance coordinate and a directional coordinate to define each possible game outcome.

BRIEF DESCRIPTION OF THE DRAWINGS

The foregoing and other advantages of the invention will become apparent upon reading the following detailed description and upon reference to the drawings.

Figure 1:
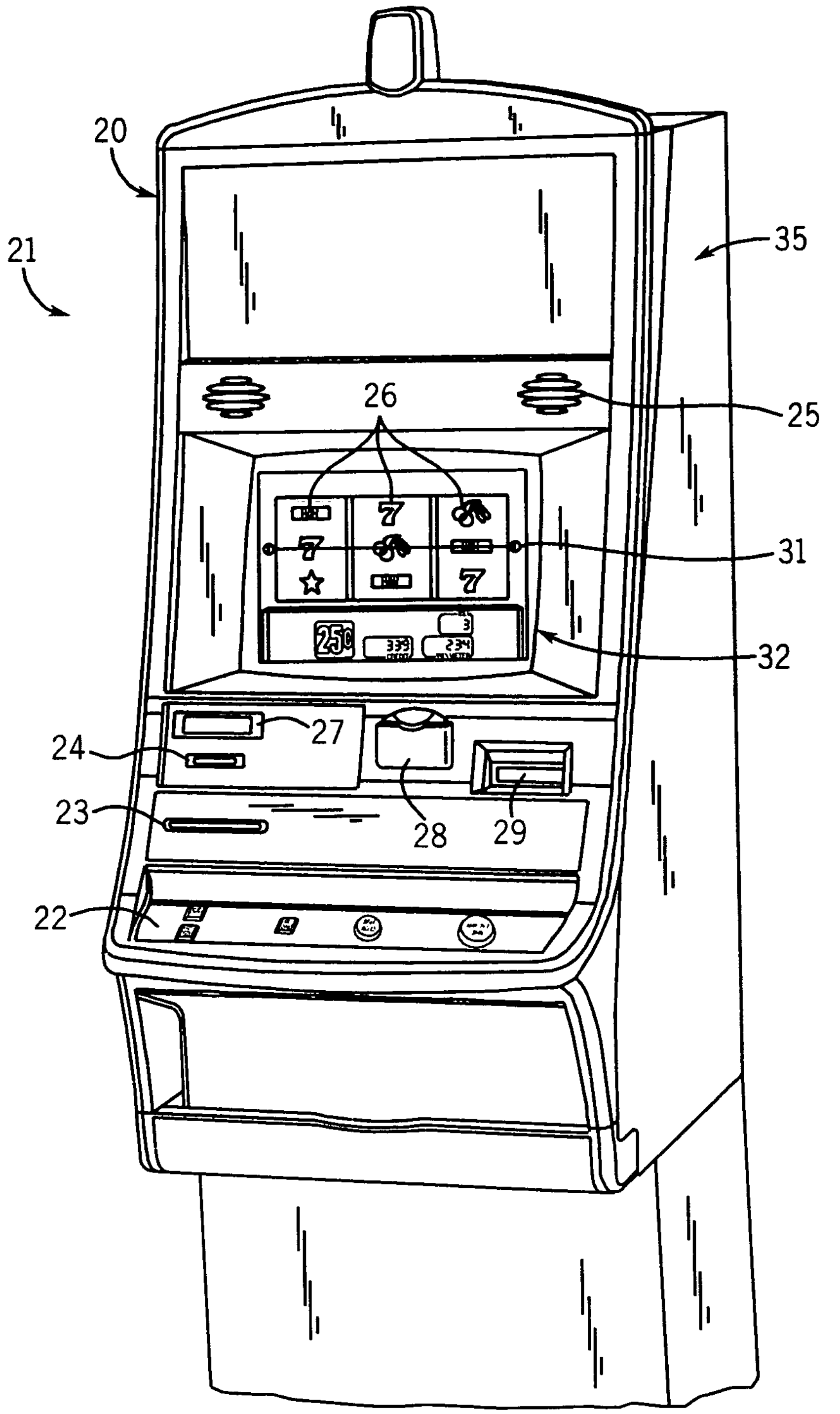
FIG. 1 is a perspective view of an electromechanical gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, an electromechanical gaming machine 21 is depicted that may be used to implement a wagering game according to the present invention. The electromechanical gaming machine 21 includes mechanical reels 26 that are used to display a base game outcome.

Figure 3:
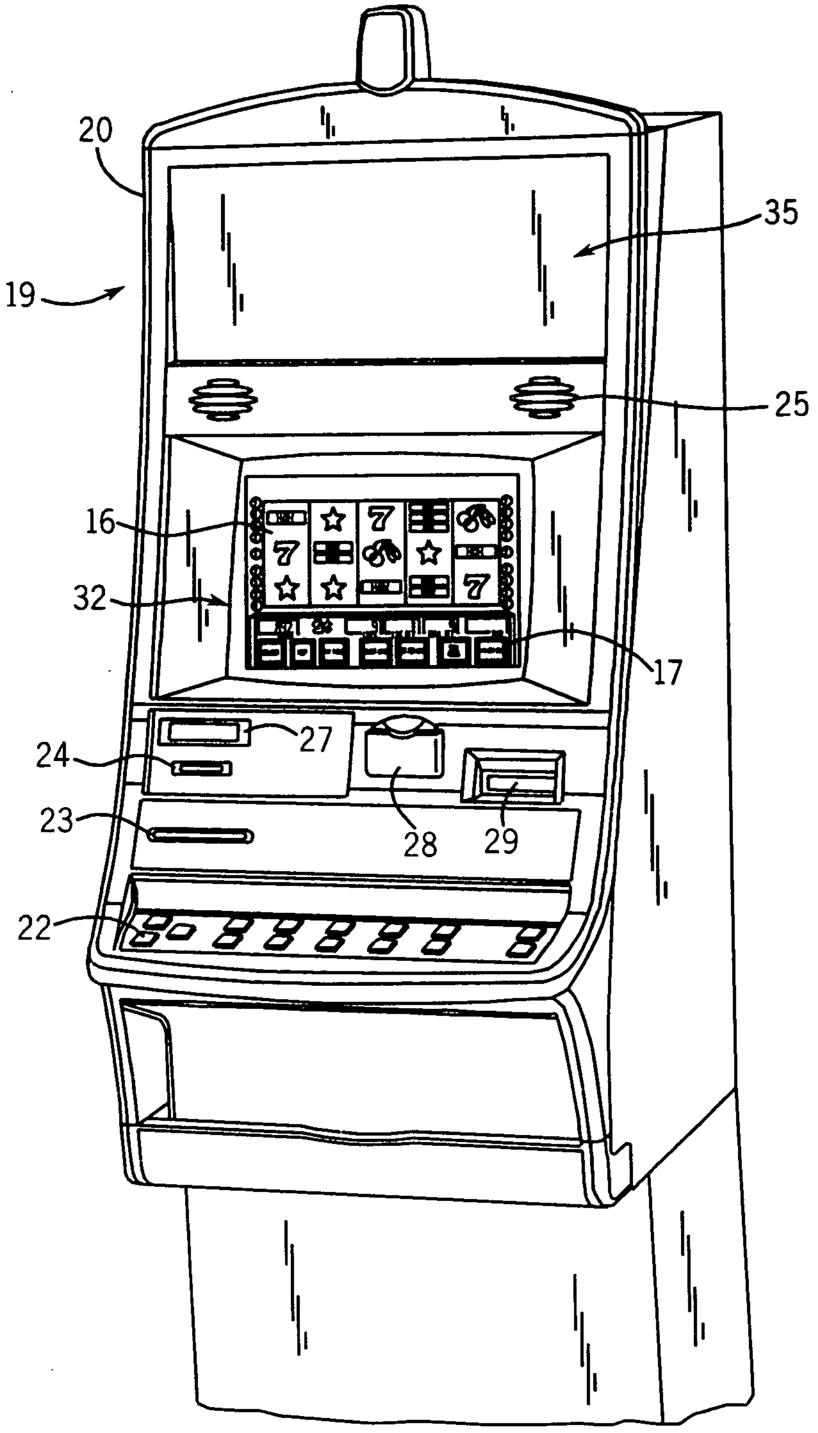
FIG. 3 is a perspective view of a video gaming machine.

Turning to FIG. 3, a video gaming machine 19 is shown. The video gaming machine 19 of FIG. 3 uses a video display 16 to display the base game outcome. The video display 16 may use a CRT, LED, LCD, or generally any other type of video display. The video display 16 may also include a touch screen 17 to allow players to make game selections.

In the illustrated embodiments, the gaming machines 20 are "upright" versions in which the video display 16 (or in the example of the electromechanical gaming machine 21, the mechanical reels 26) is oriented vertically relative to the player. It will be appreciated, however, that any of several other models of gaming machines are within the scope of the present invention, including, for example, a "slant-top" video gaming machine 19 in which the video display 16 is slanted at about a 30° angle toward the player.

Figure 2:
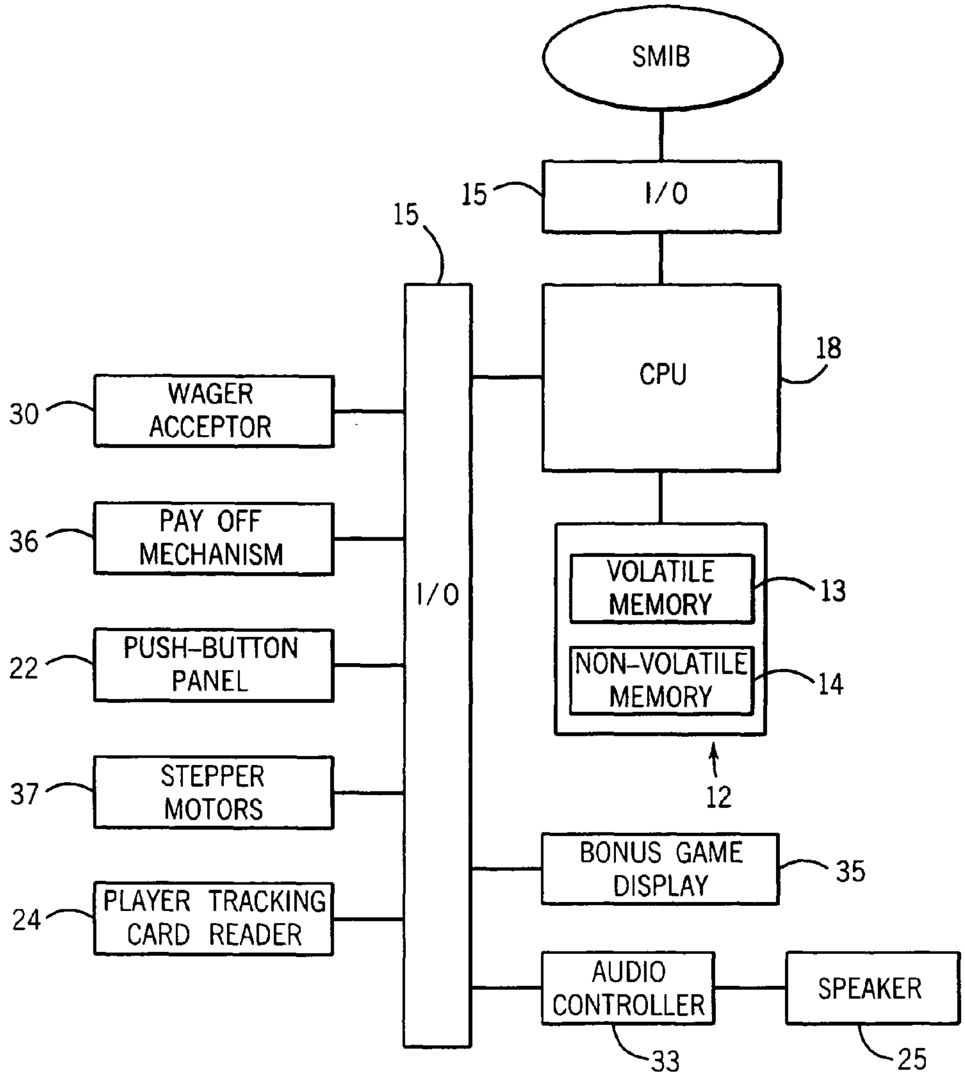
FIG. 2 is a block diagram of a control system suitable for operating the electromechanical gaming machine of FIG. 1.
Figure 4:
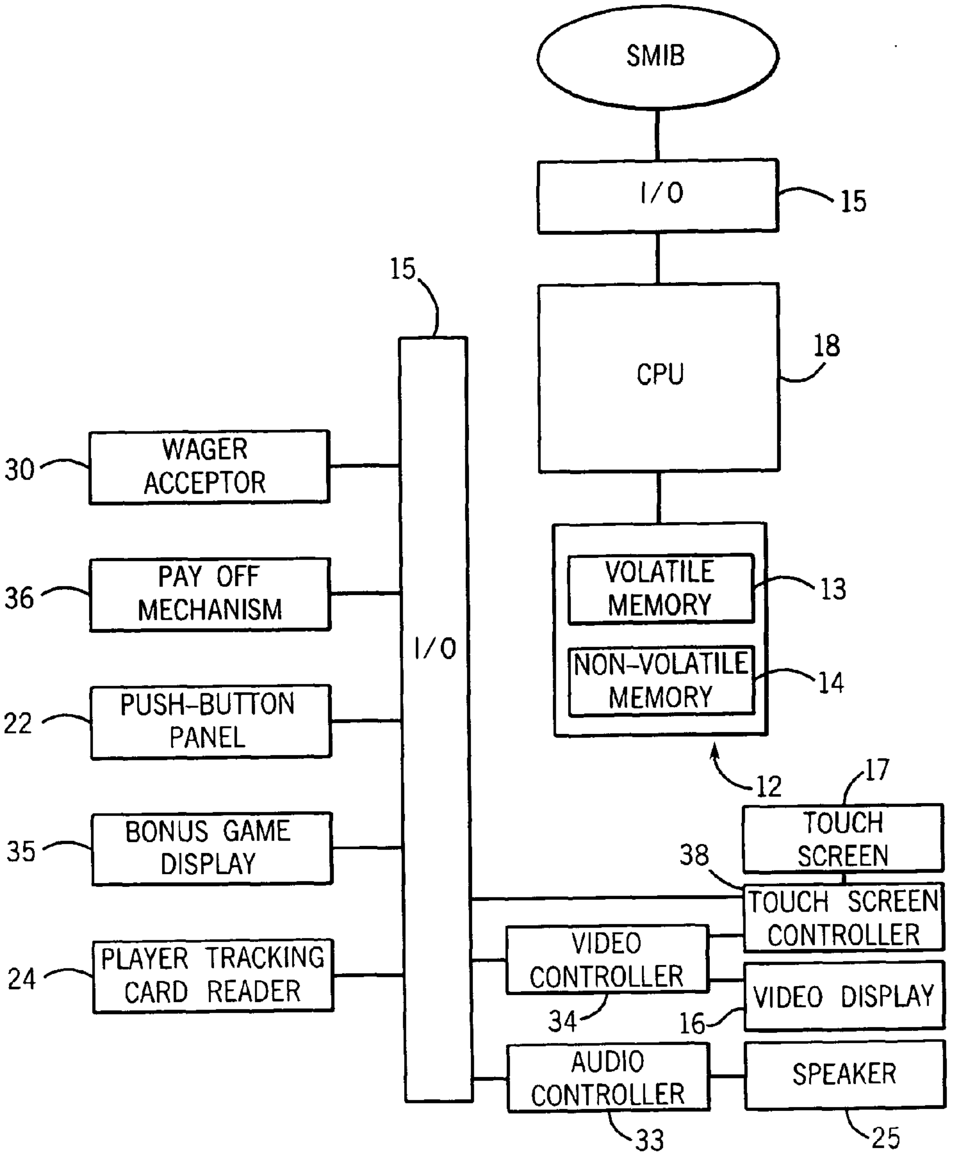
FIG. 4 is a block diagram of a control system suitable for operating the video gaming machine of FIG. 3.

Electromechanical gaming machines 21 and video gaming machines 19 generally operate in a similar manner as can be seen from FIG. 2 and FIG. 4. FIG. 2 and FIG. 4 are block diagrams of control systems suitable for operating the gaming machines 20 of FIG. 1 and FIG. 3 respectively. A CPU 18 controls the gaming machine 20 through an I/O bus 15 that communicates with a variety of peripheral devices used in the gaming machine 20. These peripheral devices include: a wager acceptor 30, stepper motors 37, touch screen controller 38, speakers 25, video controller 34, etc. For example, a wager acceptor 30 accepts the wager from a player. The wager acceptor 30 may include a coin acceptor 28 or a bill validator 29. The wager acceptor 30 signals CPU 18 when bills or coins are inserted into the gaming machine 20.

In addition to inserting a wager, the player may also insert a player-tracking card in the player-tracking card reader 24 to identify the player to the computer network controlling the gaming system. The player-tracking display 27 allows the player-tracking system to communicate with the player.

The CPU 18 executes a game program that causes the video display 16 (in the example of a video gaming machine 19) or the mechanical reels 26 (in the example of an electromechanical gaming machine 21) to display the base game outcome. For a video gaming machine 19, the base game 32 is typically a slot type game that includes simulated reels on a video display 16. For an electromechanical gaming machine 21, stepper motors 37 drive mechanical reels 26. The player may select the number of paylines 31 to play and wager amounts via the touch screen 17 or push-button panel 22. The base game 32 commences in response to the player activating the game through the push-button panel 22 or the touch screen 17, causing the CPU 18 to set the reels in motion, to randomly select a base game outcome, and then stop the reels to display symbols corresponding to the pre-selected base game outcome. The CPU 18 randomly selects a base game outcome from a plurality of possible base game outcomes using a random number generator (RNG). In one embodiment, certain base game outcomes cause the CPU 18 to trigger a bonus mode (i.e., triggering a bonus game 39).

The bonus game display 35 is typically presented in the top box portion of the gaming machine 20 as shown in FIGS. 1 and 3. The bonus game display 35 generally uses a video display 16 or a mechanical display to present the bonus game 39. The bonus game 39 generally provides the player a higher probability of receiving a favorable game outcome from the bonus game then the base game. The bonus trigger temporarily interrupts the base game, transferring the player to the bonus game and escalates the anticipation of the bonus game outcome. If desired, however, the bonus trigger is not required, and the bonus game may be available or activated for each base game outcome.

The programming for both the base and the bonus games necessary to execute the gaming machine's 20 functions are stored in system memory 12. This stored program is operable in association with the CPU 18 to execute the program's instructions. The system memory 12 stores control software, operational instructions, and data. In one embodiment, the system memory 12 comprises a non-volatile (separate read-only memory (ROM)) 14 and volatile (random access memory (RAM)) 13. The system memory 12 may be implemented on any of several alternative types of memory structures or may be implemented on a single memory structure.

A payoff mechanism 36, such as a ticket printer 23, is operable in response to instructions from the CPU 18 to award a payoff of credits to the player in response to certain winning outcomes that may occur in the base game 32 or bonus game 39. Cash or coin may also be dispensed to provide a payoff to the player for a selected game outcome 41.

The payoff amounts corresponding to specific game outcomes (e.g., combination of symbols) in the base game 32 are predetermined according to a pay table stored in system memory 12. The payoff amounts corresponding to bonus game outcomes may also be stored in system memory 12.

Gaming machines 20 also typically include a speaker system as illustrated in FIG. 1 and FIG. 3 as a pair of speakers 25. These speakers 25 broadcast the game's audio output to the player. The audio output may include messages related to game play or background music to accompany game play.

The speaker output is controlled by the CPU 18 using a digital signal processor (DSP) to process audio data. The CPU 18 may also include memory for storing the audio data (typically called a data set), which the DSP processes. System memory 12 may also be used to store audio data sets. The processed audio data set is converted to analog audio signals that are amplified external to the main control board by an audio controller 33 and transmitted to the speakers 25 to provide audio output. Alternately, the audio controller 33 may contain the major audio components typically included in the CPU 18.

In a similar matter, video sequences used to display game outcomes may be stored in system memory 12. The CPU 18 retrieves the video sequence corresponding to the game outcome selected by the RNG. The video sequence comprises a video data set ported to the video controller 34 to produce a video image on the video display 16.

Alternatively, the video data sets may be stored on the video controller 34. The CPU 18 may identify the appropriate video sequence associated with the randomly determined game outcome. The identification of the video sequence is ported to the video controller 34, which retrieves the corresponding video data set from its memory. Any type of audio and video control systems such as though as described above, and any number of variants may be used to implement the present invention.

Figure 5:
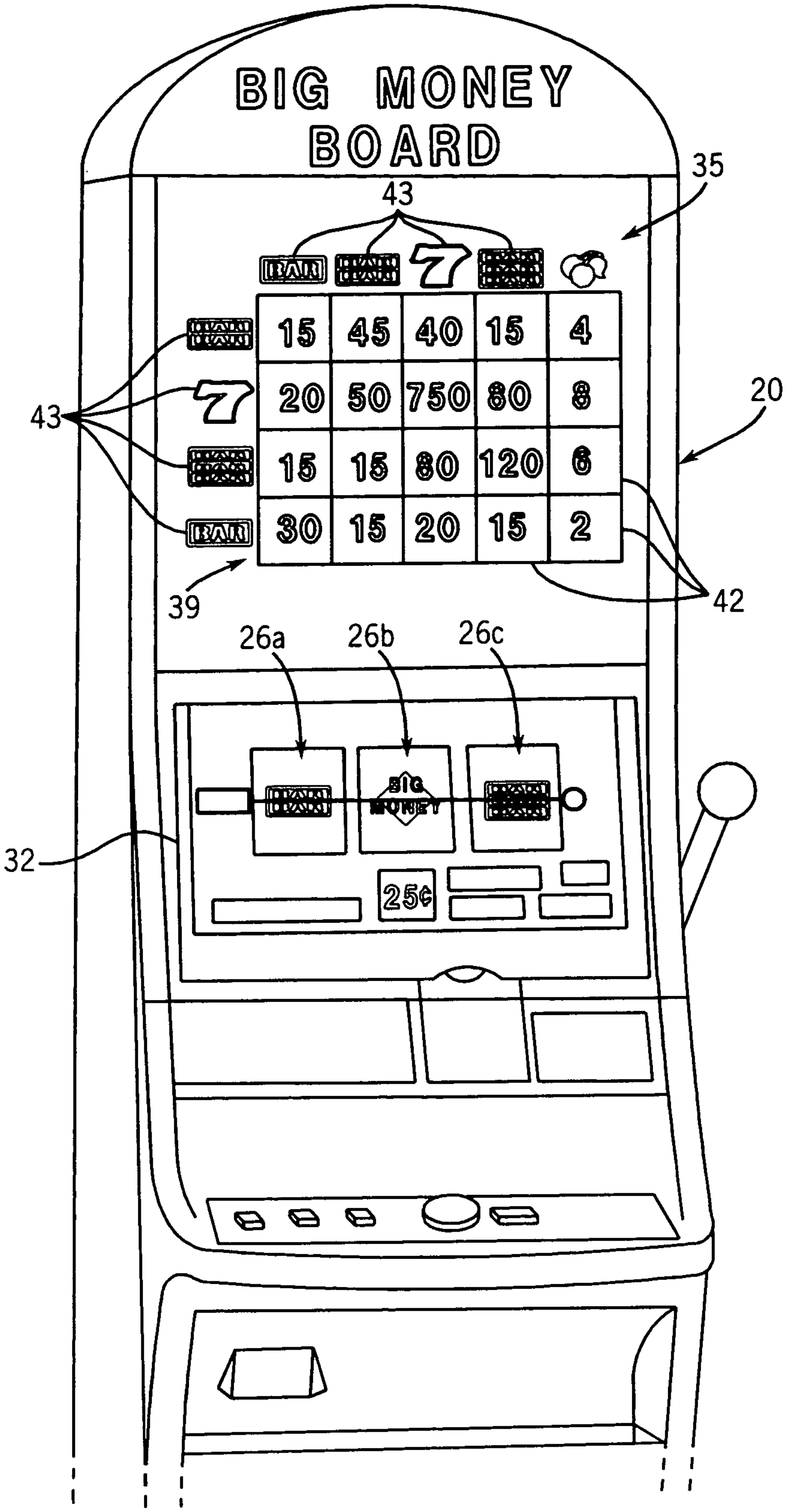
FIG. 5 is a first embodiment of the bonus game presented using a rectangular array to present award groups of FIG. 1.

Turning to FIG. 5, an electromechanical gaming machine 21 with a bonus game display 35 is shown. All of the possible game outcomes 42 are shown in the bonus game display 35 in a rectangular array, organized in both horizontal and vertical award groups 40. Mechanical reels 26*a*, 26*b* and 26*c* are used to display a base game outcome. A specific reel symbol on reel 26*b* is used to trigger the bonus game 39 (although any triggering event may be used to commence the bonus game).

Figure 6:
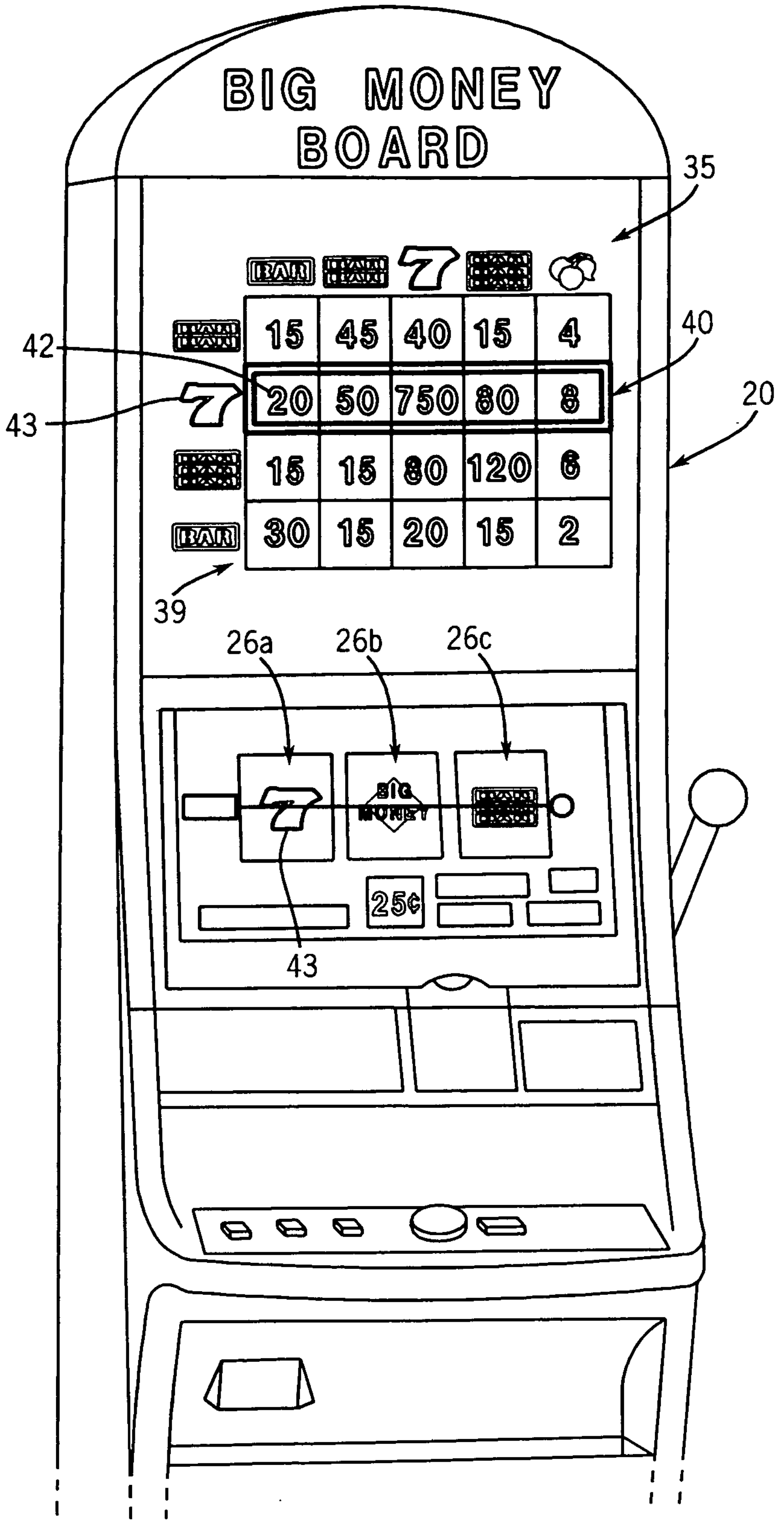
FIG. 6 is the bonus game of FIG. 5 with the first award group selected.

In one embodiment, the symbol indicia on reels 26*a* and 26*c* may be used has a selector mechanism to select identifiers 43 that are associated with each of the award groups 40 in the array. For example, after the triggering event, the mechanical reel 26*a* is re-spun to determine a symbol indicium. The symbol indicium selected by reel 26*a* is an identifier 43 of one of the plurality of horizontal award groups on the rectangular array in the bonus game display 35. As shown in FIG. 6, the symbol indicium "7" has been selected by reel 26*a* in the base game 32 as the selected identifier 43. The selected identifier 43 designates the horizontal award group 40 in the top box bonus game display 35. The corresponding horizontal award group is shown with an additional box to indicate the selected group.

Figure 7:
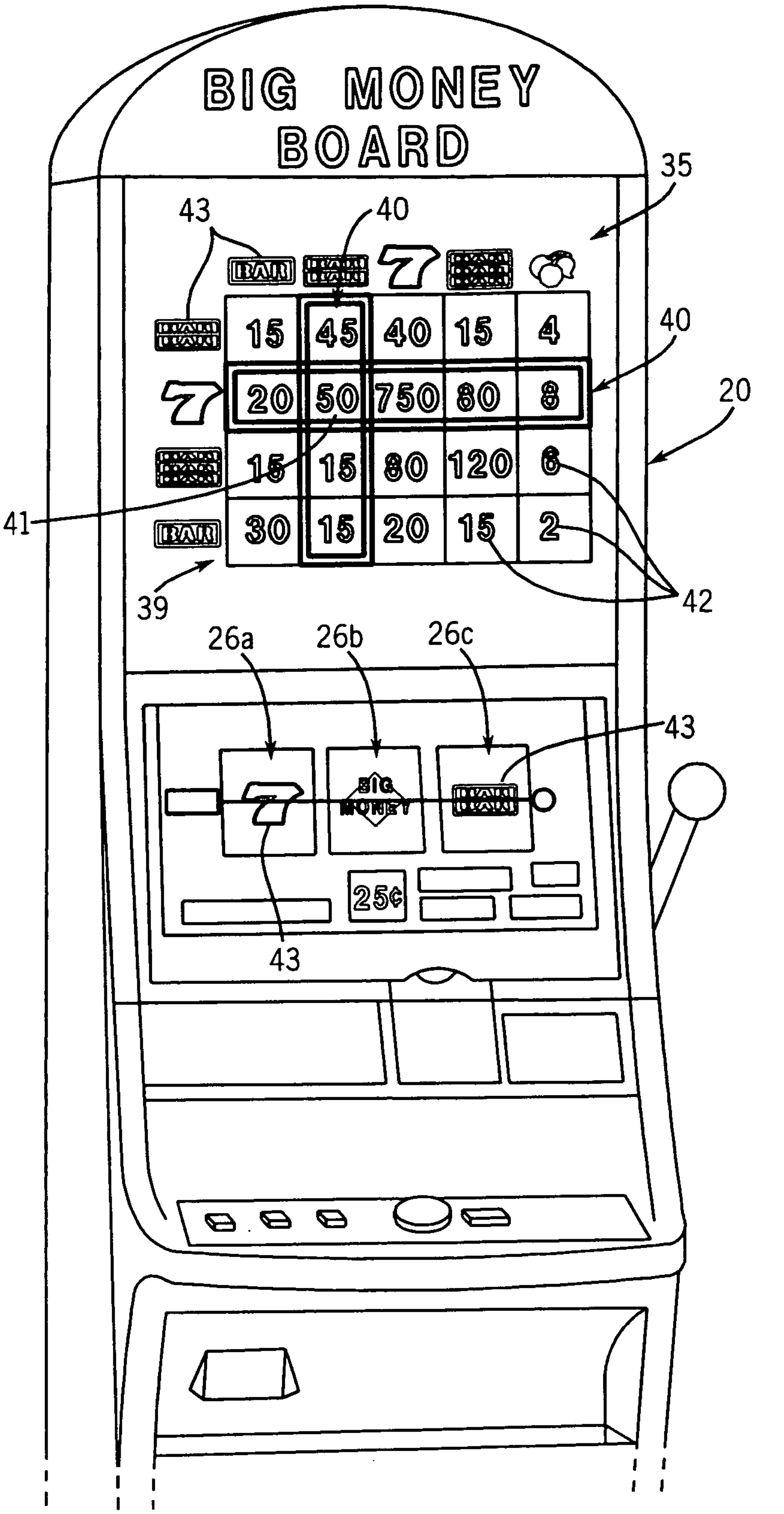
FIG. 7 is the bonus game of FIG. 6 with the second award group selected to determine the bonus award.

Next, reel 26*c* is re-spun and a "double bar" symbol indicium is determined as shown in FIG. 7. This symbol indicium is the second selected identifier 43. The second selected identifier 43 designates the vertical award group 40 in the top box bonus game display 35. The selected vertical group is shown with an additional box to indicate the selected group. The intersection of the selected vertical and horizontal award groups 40, determined by the identifiers 43 determined by reels 26*a* and 26*c*, determines the selected game outcome 41. The selected game outcome 41 can also be thought of as possible game outcomes common to each of the selected award groups 40.

In another embodiment, the base game 32 may only be used to trigger the bonus game 39. The award groups 40 may be selected entirely within the bonus game 39 using any number of different game play mechanics.

Figure 8:
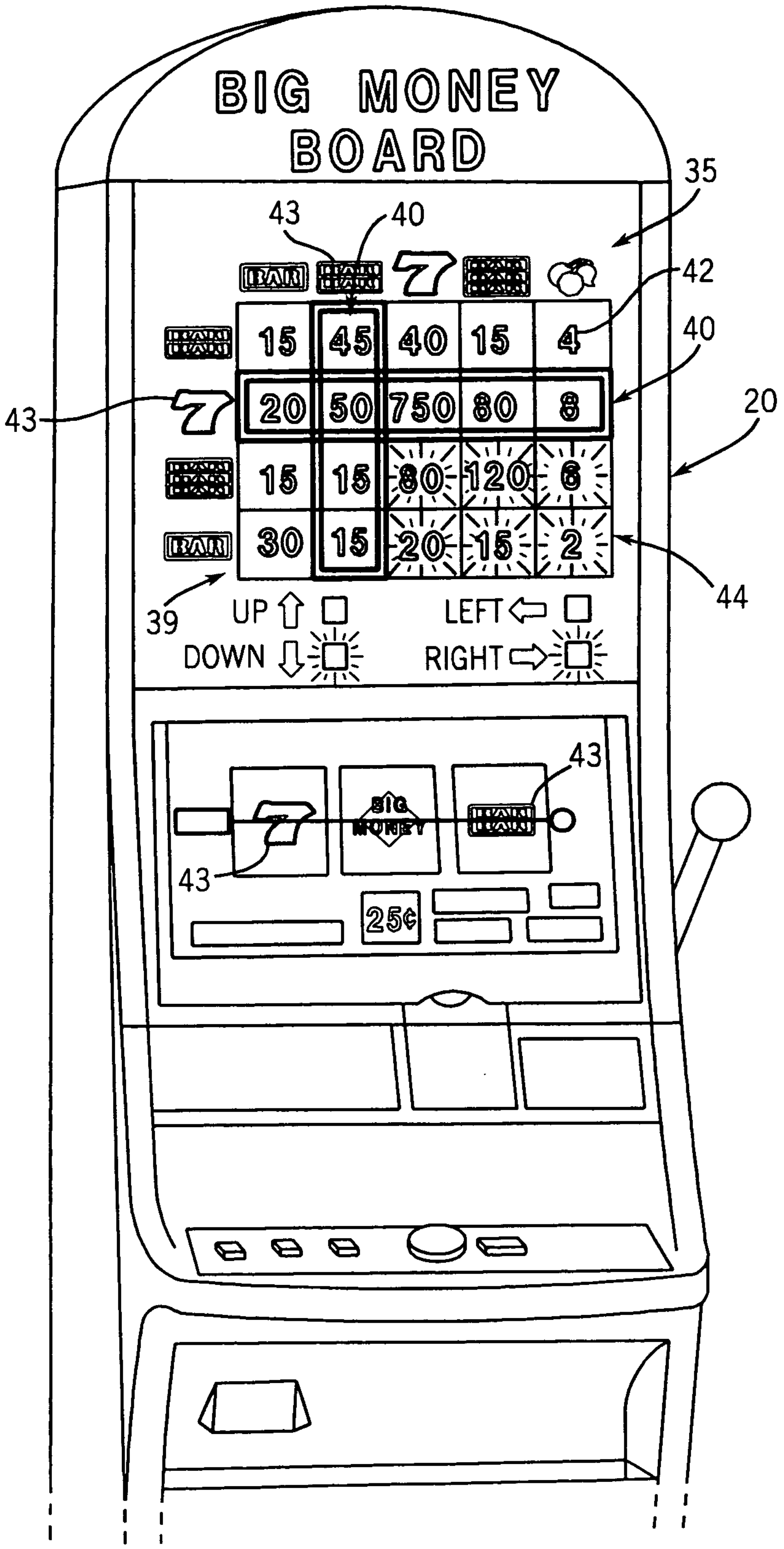
FIG. 8 is the bonus game of FIG. 5 with both the first and second award groups determined and the selected game outcomes determined by the award area created relative to the first and second award groups.

Another embodiment of the game is shown in FIG. 8. In this embodiment, the player (or the gaming machine 20) selects an award area 44 that is above or below, and either left or right of the vertical and horizontal selected award groups 40 before the award groups are selected, or alternatively, after one of the award groups has been selected. The award areas or the relative directional selections relative to each selected award group to determine an award area can be made using the video display 16 in association with a touch screen 17 or with the pushbutton panel 22. The player receives the selected game outcomes 41 common to both of the selected award areas. Alternately, the selected game outcomes 41 are the intersection of the possible game outcomes in the selected award areas.

In the example of the game shown in FIG. 8, the player has selected the award area 44 below and to the right of the selected groups. The awarded game outcomes may be limited to game outcomes inside the boundary of the randomly selected award groups 40 as shown in FIG. 8, or may include the game outcomes included in the boundary itself that border the selected game outcomes 41. Rather than designating the rows and columns, the boundaries separating the rows and columns may be designated by identifiers 43. This method provides a clearer indication to the player of the actual selected game outcomes to be awarded the player using this game play mechanic.

Numerous alternative embodiments and enhancements can be made to the game without departing from its spirit. For example, a player may have a number of chances to randomly reselect a different award group 40. If the player does not desire the randomly selected group, the player may reject that group and use an available chance to randomly determine a new group. With this mechanism, the player can potentially improve the game outcome.

Figure 9:
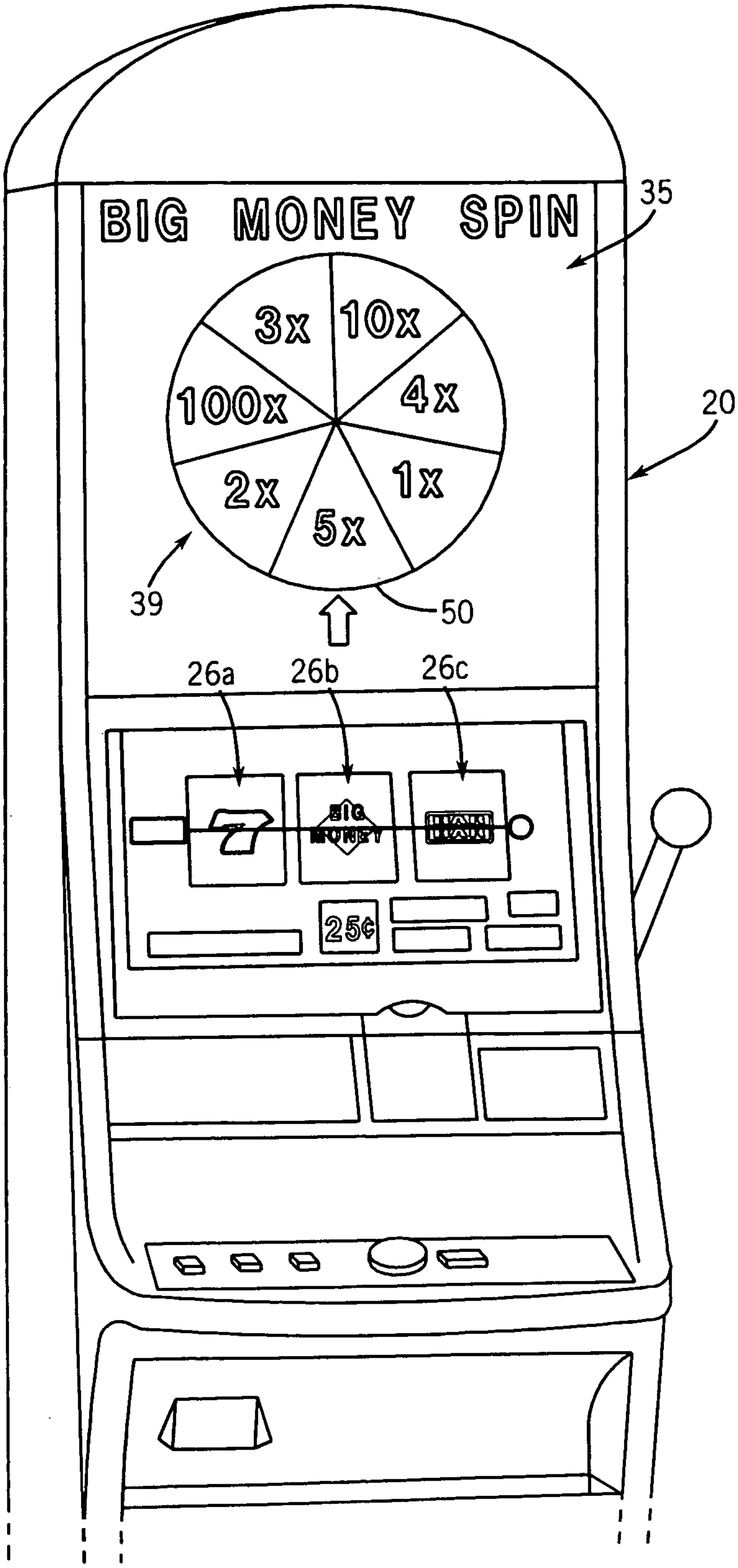
FIG. 9 is a second embodiment of the bonus game presented using circular array to present award groups.

Still another embodiment emphasizes that the array need not have any particular geometrical pattern as shown in FIG. 9. The bonus game display 35 may be a circular array in contrast to the rectangular arrays previously shown. Possible game outcomes 42 are located in radial and concentric award groups 40. The radial award groups 40 may be designated by an identifier as determined by the symbol indicium on the base game 32 reel 26*a*. The concentric award groups 40 (either the inner or the outer semicircular segments as shown in FIG. 9) may be designated by an identifier as determined by the symbol indicium on the base game 32 reel 26*c*. For example, reel 26*c* may use the standard base game symbols to identify each of the concentric award groups 40. If less than all the standard base game symbols are needed to identify each of the concentric award groups 40 (as is the case of the two concentric award groups shown in FIG. 9), an additional symbol indicium characteristic may be used to identify the concentric award groups 40. For example, the color of the symbol may designate the concentric word group 40. Thus, a red symbol (regardless of the base game symbol) may indicate the inner concentric award group and a blue symbol may indicate the outer concentric award group. The intersection of the radial award groups 40 with the concentric award groups determines the selected game outcome 41. Other mechanisms and indicia may also be used to identify both concentric and radial award groups 40.

In the context of rectangular and circular arrays, the possible game outcomes 42 can be designated in terms of rectangular and polar coordinates respectively. In either type of array, a first and a second coordinate can be determined to locate a selected game outcome 41. With a rectangular game array, the selection of an x-coordinate and a y-coordinate determine the winning game outcome 41. With polar coordinates, a distance and an angle (or a radial segment) determine the winning game outcome 41. In both cases, the initial coordinate value provides a player some information that narrows the possible game outcomes that may be awarded.

Another embodiment of the game does not depend on the intersection of the award groups 40. The award groups 40 are independently displayed. Possible game outcomes 42 may be duplicated in several, if not all, of the various award groups 40. Award groups 40 may be randomly selected and possible game outcomes 42 common to the selected groups may be awarded to the player. For example, when two or more award groups 40 are selected, the possible game outcomes 42 that are common members to each of the selected award groups 40 are highlighted on the display for the player. It is possible that more than one of the possible game outcomes 42 is common to the selected groups. If desired, to reduce the number of selected game outcomes 41, the number of groups received by the player may be increased. For example, the player may only receive the possible game outcomes 42 common to three different groups. Consequently, it may be an objective of the player to receive the fewest number of groups possible to make it easier to obtain matching possible game outcomes 41.

Although the possible game outcomes 42 are shown as credit values, it should be understood that the possible game outcomes 42 could be any type of award or game play feature. For example, in addition to awarding credit values, the possible game outcomes 42 may also include multipliers or a combination of multipliers and credit values. The possible game outcomes 42 may also include the provision of free spins, wild cards, tools to enhance game play, etc. Further, although it is contemplated that in general the award or game play feature will provide a positive benefit to the player, it is also possible that such a selection will provide a negative or detrimental effect to the player's game outcome. With respect to negative outcomes the possible game outcomes 42 may include lose a turn, lose a portion of a wager, return to the base game play (also known as a stopper or terminator), etc. These possible game outcomes 42 may be used in any combination.

In addition, if desired, a second, different bonus game may be played and triggered by a different bonus trigger in the base game. Further, if desired, a special multiple bonus trigger may be created (either a single special symbol or a combination of symbols) that allows a player to play all the bonus games on the gaming machine with the single multiple bonus trigger. Gaming machines offering three or more different bonus games 39 may allow the player to play all three different bonus games (or some subset of multiple bonus games) offered on the gaming machine 20 when the multiple bonus trigger occurs.

Although the above embodiments describe numerous game play mechanics to which the present invention can be applied, it should be understood that the present invention could be applied to many other types of games. While the present invention has been described with reference to one or more particular embodiments, those skilled in the art will recognize that many changes may be made thereto without departing from the spirit and scope of the present invention. For example, the embodiments discussed may use a gaming machine which itself determines the game outcome with an onboard central processor unit. Alternately, the gaming machine may be in a network that uses a central processor unit to control and determine the game outcomes for each of the gaming machines in that network. Each of these embodiments and obvious variations thereof is contemplated as falling within the spirit and scope of the claimed invention, which is set forth in the following claims.

What is claimed is:

1. A gaming machine, comprising:

a wager acceptor for accepting a wager to initiate game play;

a central processor unit for randomly selecting a selected game outcome from a plurality of possible game outcomes, the plurality of possible game outcomes forming a plurality of groups, each of the plurality of possible game outcomes defined by two groups from the plurality of groups, each of the plurality of groups being associated with an identifier to designate each of the plurality of groups, the central processor unit further for determining the two groups defining the selected game outcome;

a selector mechanism in communication with the central processor unit, the selector mechanism displaying the identifier of each of the two groups defining the selected game outcome, the selector mechanism being a set of reels in a base game;

a display in communication with the central processor unit, the display for displaying each of the plurality of groups and the plurality of possible game outcomes in each of the plurality of groups; and a payoff mechanism in communication with the central processor unit to make an award for the selected game outcome.

2. The gaming machine as described in claim 1, wherein the selected game outcome is the intersection of the two groups on the display defining the selected game outcome.

3. The gaming machine as described in claim 1, wherein the selected game outcome is common to the two groups defining the selected game outcome.

4. The gaming machine as described in claim 1, wherein the selector mechanism sequentially displays the identifier of the two groups defining the selected game outcome.

5. The gaming machine as described in claim 1, wherein the selector mechanism displays the identifier of the two groups defining the selected game outcome simultaneously.

6. The gaming machine of claim 1, wherein the award includes award values displayed in an award area bound by the two groups.

* * * * *